United States Patent Office 3,384,941
Patented May 28, 1968

3,384,941
GEL CUTTER
Hideo Koike, Silver Spring, Md., Gokaldas C. Parikh, Brookings, S. Dak., and Isaac L. Shechmeister, Carbondale, Ill., assignors to Southern Illinois University Foundation, Carbondale, Ill., a corporation of Illinois
Filed Jan. 24, 1966, Ser. No. 522,605
10 Claims. (Cl. 25—105)

ABSTRACT OF THE DISCLOSURE

A cutter for forming a plurality of holes in a gel for studying antigen-antibody reactions of biologicals. The cutter is comprised of a base for supporting the gel and a ring rotatable on the surface of the base. A pair of guide bars are supported from the ring and a slide carrying a vertically movable cutting member is movable along the bars from a first position wherein the cutting member is coaxial with the axis of rotation of the ring for making an axial cut, to a second position wherein the cutting member is spaced from the axis for making a plurality of cuts in a circle about the axial cut.

---

Figure 1:
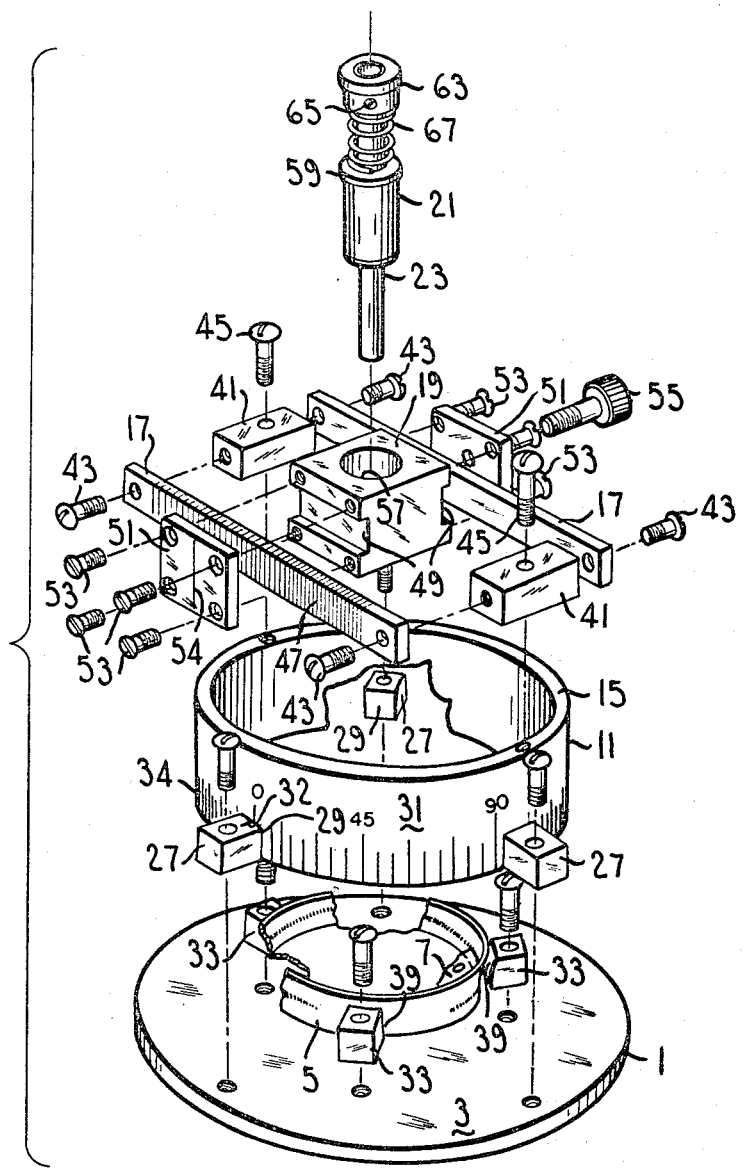

This invention relates to a cutter for forming cups or holes in a gel or like substance, and more particularly to an adjustable cutter for forming such cups or holes.

In studying antigen-antibody reactions of biologicals, it is common practice to form a pattern of cups or holes in a suitable gel. The cups are normally arranged so that there is a central cup which receives an antibody and a plurality of peripheral cups arranged in a circle about the center cup with the peripheral cups receiving the same or different antigen solutions. The molecules from the antibody and antigen move through the gel and may react or unite if they are specific for each other and if the cups are properly spaced from each other. If they unite, there is a visible reaction in the gel (called a precipitate and there may be several lines visible if different molecular components are reacting. Different reactions may be obtained depending upon the number of the cups, the size or diameter of the cups and the distance between the central cup and the peripheral cups as well as the distance between the various pairs of adjacent peripheral cups. The desired reactions may not be obtained if the spacing between the cups is either too great or too small. As a result difficulty may be encountered in obtaining partial or complete identity of precipitinogens or precipitating antigens in adjacent cups.

Cutters previously used for forming cups in gels include templates having (for each template) a specific number of cup cutters of a particular diameter arranged in a fixed pattern. Therefore, whenever it is desired to change the spacing between the cups in the gel, or to change the number and pattern of cups, or to change the diameters of the cups, a different template must be used. For this reason a large number of templates are normally stocked and even then the desired arrangement, number and size of cups desired may not be readily available. It is thus expensive to purchase all of the apparatus necessary to provide desirable variations in cup sizes and spacings, and there has been an unfulfilled need for a simple, more economical gel cutter which would not suffer from the above prior art shortcomings.

Accordingly, among the several objects of the invention may be noted the provision of an improved gel cutter capable of adjustment to vary either the number and size of cups or holes, and the arrangement or spacing between cups or holes formed in a gel by the cutter, and the provision of a gel cutter wherein the size of cups can be easily varied with a minimum of difficulty and expense; the provision of a cutter for forming cups in gels which is easy to use; the provision of a gel cutter which permits formation of cups of various sizes in a wide variety of patterns and which is inexpensive; and the provision of a multipurpose cutter which is substantially maintenance-free and is easy to clean. Other objects and features will be in part apparent and in part pointed out hereinafter.

The invention accordingly comprises the constructions hereinafter described, the scope of the invention being indicated in the following claims.

Figure 2:
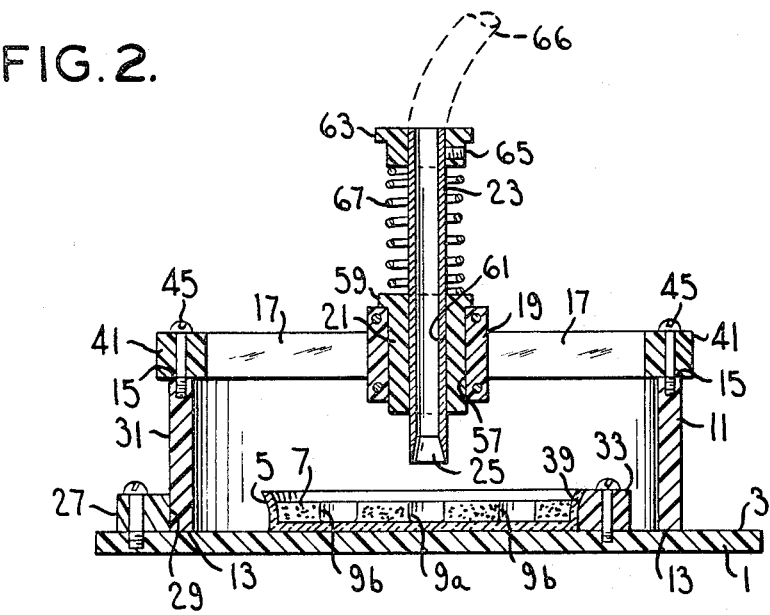

In the accompanying drawings, in which one of various possible embodiments of the invention is illustrated, FIG. 1 is an exploded view, partially broken away, of a gel cutter of this invention; and FIG. 2 is a section through the FIG. 1 cutter.

Corresponding reference characters indicate corresponding parts throughout the several views of the drawings.

Referring now to the drawings, a gel cutter of this invention generally comprises a base 1 shown as a circular plate having a flat upper surface 3 which is adapted to receive a conventional Petri dish 5. Dish 5 receives a suitable gel substance designated 7 which can be a culture medium with an agar-agar base commonly referred to as an agar gel. The apparatus of this invention can be used for cutting openings in the gel 7 at predetermined locations to form cups or recesses in the gel. Usually there is one center cup 9a and a plurality of peripheral cups 9b formed in the gel.

A ring 11 has a lower edge 13 which rests on the upper surface 3 of base 1 around the Petri dish 5. Ring 11 is adapted to be rotated on surface 3 about its own axis and the center of dish 5. Mounted on the upper edge 15 of ring 11 are a pair of calibrated guide bars 17. A slide 19 is movable across ring 11 on bars 17. Slide 19 carries a tube holder 21 which guides movement of a tube 23. Tube 23 constitutes a cutting member and has at its lower end an annular knife edge 25. By rotating ring 11 on base 1 and by moving the slide 19 relative to the bar 17, the knife edge 25 can be adjusted to any position over the gel 7 in the Petri dish 5. Then by moving the tube downwardly the gel can be cut and a small portion of the gel removed to form the cups 9a and 9b.

More specifically, the gel cutter of the invention has three guide blocks 27 mounted on the upper surface 3 of the base and positioned around the ring 11 at approximately 120° intervals. Each guide block has an inner surface 29 in close proximity to the outer surface 31 of the ring. There is a hair line 32 on the block shown at the left in FIG. 1. A scale 34 on ring surface 31 is marked from 0 to 360 to indicate degrees of a circle. Ring 11 can be rotated a specific number of degrees by using scale 34 and hair line 32.

There are three inner guide blocks 33 mounted on surface 3 of the base at approximately 120° intervals from each other and staggered at 60° intervals relative to the outer guide blocks 27. Each of guide blocks 33 has an inner surface 39 which is preferably shaped to complement the outer edge surface of the Petri dish 5. As shown in FIG. 2, the Petri dish fits closely against the inner surface 39 and is approximately concentric with ring 11. Thus the guide blocks 27 and 33 together prevent any substantial lateral movement of the Petri dish or the ring 11 and guide movement of the ring 11 about its own axis and about the center of the Petri dish. Since ring 11 has only a sliding connection with the outer guide blocks and with the upper surface 3 of the base, it can be lifted upwardly from the base when the Petri dish is being inserted or removed.

The guide bars 17 are located in spaced, generally parallel relation by a pair of end blocks 41 positioned between the ends of the bars and secured to the bars by screws 43. End blocks 41 are mounted on the upper edge 15 of ring 11 by screws 45. Bars 17 extend across the ring so that the cutting tube 23 can be moved along the bars to various positions over the Petri dish. There are a series of scale marks or graduations at regular intervals along at least one of the bars 17 to form a scale 47 which is used for accurately locating slide 19 and the cutting tube at a predetermined position along the rails as explained hereinafter. The scale 47 can be marked-off in any desired increments, such as 0.1 cm. for example.

Slide 19 is generally in the shape of a block or cube having recesses 49 extending entirely across two opposite faces. These recesses receive the inside edge portions of bars 17. A pair of cover plates 51 positioned along the outer surface of bars 17 are held against the bars by screws 53 extending through the plates and above and below the bars into the slide 19. The position of the slide 19 relative to the bars can be determined by reading scale 47 along a side edge of cover pltaes 51 or along a hair line 54 on one side of the cover plate. A thumb screw 55 extends through a hole in one of the cover plates and is adapted to be tightened against one of the bars 17 to lock the face plates and thus the slide 17 and cutting tube 23 at any position along the bars 17.

Slide 19 has a cylindric hole 57 extending through it from its upper surface to its lower surface and substantially perpendicular to the length of the grooves 49. Hole 57 receives the generally cylindrical tube holder 21. Holder 21 is prevented from dropping through the slide by an outwardly projecting rim or shoulder 59 which engages and rests on the upper surface of the slide. The tube holder has a cylindric hole or opening 61 which receives the tube 23 and guides it for movement in a vertical direction toward and away from the Petri dish. Hole 61 is preferably just slightly larger than the outside diameter of the tube 23 to prevent misalignment of the axis of the tube and the hole. The axis of tube 21 is substantially perpendicular to the surface 3 of the base 1.

A collar 63 is fixed on the upper end of tube 23 by a set screw 65. A helical spring 67 coiled around the tube 23 reacts from the upper surface of the tube holder 21 against the lower surface of the collar 63 for biasing the collar and thus the tube 23 upwardly to the FIG. 2 position. By pressing downwardly on the collar 63, tube 23 is moved downwardly into engagement with the gel 7 for removing a portion of the gel to form the cup shaped holes 9a and 9b in the gel. If desired, gel cut by tube 23 can be removed through the tube by connecting the upper end of the tube to a cannula or rubber tubing 66 attached to a suction source and trap (not shown).

Operation of the cutting apparatus of the invention will now be described.

In order to place a Petri dish 5 on the upper surface 3 of the base 1, the ring 11, guide bars 17, slide 19, tube holder 21 and tube 23 are removed as a unit from the apparatus. This is conveniently accomplished by simply lifting upwardly on the ring 11. Then the dish 5 is placed on surface 3 and is centered by contact of its outer surface with the surfaces 39 of the inner guide blocks 33. Ring 11 is then replaced with its outer surface 31 substantially abutting the inner surface 29 of the three outer guide blocks 27.

For the purpose of illustrating the use of the cutter of the invention, it will be assumed that it is desired to cut one cup 9a in gel 7 at the center of the Petri dish and six peripheral cups 9b each of which is to be spaced approximately 3 cm. from the center hole and equally spaced from each other. Slide 19 is first moved to a position where it is centered directly over the center of the Petri dish. This is accomplished by moving the slide along bars 17 until the hair line 54 on cover plate 51 is aligned with a zero marking on the scale 47 which indicates that the cover plate and thus the slide and tube are centered relative to the ends of the bars. Then thumb screw 55 is tightened to lock the slide in this position. Collar 63 is depressed to move tube 23 downwardly until the knife edge 25 penetrates the gel 7 immediately beneath it. This forms a generally cylindric cut or cup-shaped opening in the gel and the gel from the cut can be removed from the end of tube 23 in any suitable manner, such as by the use of suction through a cannula or rubber tube 66 as previously described. Then collar 63 is released and spring 67 returns the tube to the position shown in FIG. 2.

Next the slide 19 and the cutting tube are moved along bars 17 until the tube is 3 cm. from its original position. This is determined by scale 47 and hair line 54 on the cover plate 51. Then thumb screw 55 is again tightened to lock tube 21 in place. The tube remains locked in this position relative to bars 17 during formation of all of the peripheral cups 9b. Ring 11 is then rotated to bring the zero marking on scale 34 on its outer surface into alignment with the hair line 32 on the guide block 27 as shown at the left in FIG. 1. Collar 63 is again depressed and the knife edge 25 penetrates the gel 7 and a portion of the gel is removed to form one of the peripheral cups 9b. Collar 63 is then released and the tube is raised to its FIG. 2 position by spring 67. Then ring 11 is rotated to move the 60° marking thereon into alignment with the hair line on the block 27. Collar 63 is again depressed and a portion of the gel removed to form another one of the peripheral cups. The collar is then released and the ring 11 rotated another 60°. This continues until all six of the peripheral cups 9b have been formed. The ring and associated parts are then lifted from above the Petri dish and the dish removed.

If larger or smaller size cups are preferred, then the tube 23 is replaced with a larger or smaller size tube. Preferably the tube holder 21 is replaced at the same time so that there is always a snug fit between the cutting tube and the hole 61 in the tube holder. This prevents cocking or wobbling of the tube which might cause the cups formed in the gel to be improperly located.

The cutter of the invention permits any desired spacing between the central cup and the peripheral cups. Moreover, it permits adjustment of the number of peripheral cups and the distance between the various peripheral cups. These adjustments are necessary, for example, for ideal comparison of two or more antigenic preparations against an antiserum since it is necessary to obtain a critical distance between the antigen and antibody cups. The adjustments necessary to obtain ideal comparisons are obtained by simple adjustments of the apparatus itself, not by replacing templates as is required with prior art apparatus. The cutter is virtually maintenance free and is easy to keep clean since only the tube 23 contacts the gel. It can be used for both micro and macro reagents. Preferably the ring and other parts of the cutter can be made of a clear transparent plastic material, such as Lucite, so that the gel cutting operations can be easily observed. While the cutter has been described in connection with cutting gel in a Petri dish, it will be understood that the gel may be placed on other carriers, such as a flat sheet or a slide, and that substances of a different consistency than gels can be cut with the cutter.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cutter comprising a base having a surface for supporting a substance to be cut,
   a cutting member, means mounting the cutting member over said surface for movement relative to the base in a first direction parallel to said surface of the base to adjust the cutting member to various positions relative to the base and in a second direction toward and away from said surface of the base for cutting a substance supported on said surface, said mounting means comprising a ring rotatable on said surface of the base, a guide bar spanning the ring, and a slide supporting the cutting member and movable along the bar from a first position wherein said cutting member is coaxial with the axis of rotation of said ring for making an axial cut, to a second position wherein said cutting member is spaced from said axis for making a plurality of cuts in a circle about said axial cut.

2. A cutter as set forth in claim 1 further comprising means associated with the slide for locking it against movement relative to the guide bar.

3. A gel cutter comprising
a base having an upper surface for supporting a gel, guide means mounted on the surface of the base,
a ring having a portion positioned on the surface of the base and being rotatable on the base about an axis passing through the center of the ring, rotation of the ring being guided by the guide means, indicia on the surface of the ring for locating the ring at certain angular positions relative to the base,
an elongate cutting member having at one end a knife edge adapted to engage and cut an opening in a gel,
an elongate guide bar movable with said ring and extending across said ring,
a slide carried by said bar and movable along the bar in a plane generally parallel to said surface of said base, the slide having a hole therethrough generally perpendicular to the plane of said base surface, and
a holder for the cutting member positioned in said hole in said slide for movement with the slide, the cutting member being mounted in said holder and adapted to be moved longitudinally along its axis toward and away from said base surface whereby a gel supported on said surface within said ring can be contacted by the knife edge of said cutting member for cutting openings in the gel.

4. A gel cutter as set forth in claim 3 further comprising means for fixing the slide at various adjusted positions along the bar.

5. A gel cutter as set forth in claim 3 further comprising means biasing the knife edge of the cutting member away from the base surface.

6. A gel cutter as set forth in claim 3 further comprising scale markings on the bar for locating the slide and cutting member at a predetermined position along the bar.

7. A gel cutter as set forth in claim 3 further comprising a second guide bar, the bars being mounted on the ring and being generally parallel to each other, the bars engaging opposite sides of said slide for supporting said slide during its movement.

8. A gel cutter as set forth in claim 3 wherein the cutting member comprises an elongate tube, and the knife edge is at one end of the tube and is annular in shape.

9. A gel cutter as set forth in claim 8 further comprising a collar on the other end of the tube, and a spring coiled around the tube and reacting from the holder against the collar for biasing the tube and cutting edge away from the base surface.

10. A gel cutter as set forth in claim 3 further comprising means on said upper surface of the base for positioning a gel-containing dish on the base.

References Cited
UNITED STATES PATENTS

| 751,723 | 2/1904 | Doolittle | 83—559 |
| 2,405,150 | 8/1946 | Kern | 83—618 |

ANDREW R. JUHASZ, *Primary Examiner.*